United States Patent
Kahara et al.

(10) Patent No.: US 9,533,586 B2
(45) Date of Patent: Jan. 3, 2017

(54) CHARGE PLUG LOCKING DEVICE

(71) Applicant: KABUSHIKI KAISHA TOKAI RIKA DENKI SEISAKUSHO, Aichi (JP)

(72) Inventors: Keiji Kahara, Aichi (JP); Naoto Kurumizawa, Aichi (JP); Toshiharu Katagiri, Aichi (JP); Hiroaki Yuasa, Nisshin (JP); Eiji Kitano, Toyota (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 378 days.

(21) Appl. No.: 14/097,838

(22) Filed: Dec. 5, 2013

(65) Prior Publication Data

US 2014/0167696 A1 Jun. 19, 2014

(30) Foreign Application Priority Data

Dec. 13, 2012 (JP) ................. 2012-272503

(51) Int. Cl.
*H01R 13/627* (2006.01)
*B60L 11/18* (2006.01)
*H01R 33/97* (2006.01)

(52) U.S. Cl.
CPC ......... *B60L 11/1818* (2013.01); *B60L 2270/32* (2013.01); *B60L 2270/34* (2013.01); *H01R 33/97* (2013.01); *Y02T 10/7005* (2013.01); *Y02T 10/7072* (2013.01); *Y02T 90/14* (2013.01)

(58) Field of Classification Search
CPC .................................................. H01R 13/6397
USPC ........................................ 439/304, 352, 142
See application file for complete search history.

(56) References Cited

U.S. PATENT DOCUMENTS

| | | | | | |
|---|---|---|---|---|---|
| 3,398,391 | A | * | 8/1968 | Brishka | H01R 13/5202 439/559 |
| 4,980,800 | A | * | 12/1990 | Furuta | E05B 47/0002 200/50.01 |
| 5,584,715 | A | * | 12/1996 | Ehrenfels | B60L 11/1818 439/222 |

(Continued)

FOREIGN PATENT DOCUMENTS

| | | |
|---|---|---|
| CN | 1676982 A | 10/2005 |
| CN | 102157832 A | 8/2011 |

(Continued)

OTHER PUBLICATIONS

Office Action dated Oct. 27, 2015 in Japanese Patent Application No. 2012-272503, along with English translation.

(Continued)

*Primary Examiner* — Neil Abrams
(74) *Attorney, Agent, or Firm* — Greenblum & Bernstein, P.L.C.

(57) ABSTRACT

A lock device includes an inlet arranged in a vehicle and having an inlet housing into which a charge cable is insertable. A lock mechanism is capable of locking the charge cable to the inlet. The lock device includes a lock mechanism attachment portion arranged in the inlet housing and enabling attachment of the lock mechanism to the inlet housing. The lock device may be located on an outer surface of the inlet housing and may include a movable lock pin that serves to retain a lock arm of the charge cable and may also be used to retain a lid for closing the inlet. With this system the inlet housing and lock mechanism form a single unit for ease of assembly.

7 Claims, 5 Drawing Sheets

(56) References Cited

U.S. PATENT DOCUMENTS

| | | | |
|---|---|---|---|
| 5,751,135 A | 5/1998 | Fukushima et al. | |
| 5,934,918 A * | 8/1999 | Wuechner | B60L 11/1818 439/133 |
| 7,950,943 B2 * | 5/2011 | Ohtomo | B60L 11/1803 439/299 |
| 7,972,154 B2 * | 7/2011 | Pech | H01R 13/625 439/173 |
| 8,206,172 B2 * | 6/2012 | Katagiri | B60L 11/14 439/352 |
| 8,357,001 B2 * | 1/2013 | Katagiri | B60L 11/1818 439/304 |
| 8,376,768 B2 * | 2/2013 | Kurumizawa | B60L 11/14 439/304 |
| 8,523,589 B2 * | 9/2013 | Kurumizawa | H01R 13/6275 439/304 |
| 8,550,833 B2 * | 10/2013 | Martin | H01R 13/6395 439/310 |
| 8,602,804 B2 | 12/2013 | Kurumizawa et al. | |
| 8,616,909 B2 | 12/2013 | Kurumizawa et al. | |
| 8,678,847 B2 * | 3/2014 | Inoue | B60L 11/1818 439/352 |
| 8,690,591 B2 * | 4/2014 | Charnesky | B60L 11/1818 191/12.4 |
| 8,698,349 B2 * | 4/2014 | Kurumizawa | B60L 11/1818 307/10.1 |
| 8,823,486 B2 * | 9/2014 | Jung | B60L 11/1818 320/104 |
| 8,936,482 B2 * | 1/2015 | Smith | E05B 47/026 33/1 PT |
| 8,951,060 B2 * | 2/2015 | Meyer-Ebeling | H01R 13/639 320/109 |
| 8,961,216 B2 * | 2/2015 | Mizuno | H01R 13/639 439/347 |
| 9,039,437 B2 * | 5/2015 | Kurumizawa | H01R 13/6397 439/352 |
| 9,088,104 B2 * | 7/2015 | Kahara | H01R 13/6397 |
| 9,168,840 B2 * | 10/2015 | Nakajima | B60K 1/04 |
| 9,199,551 B2 * | 12/2015 | Kahara | B60L 1/003 |
| 9,263,830 B2 * | 2/2016 | Sugiyama | B60L 11/1818 |
| 9,312,624 B2 * | 4/2016 | Borden | H01R 13/44 |
| 2005/0218650 A1 | 10/2005 | Pepe et al. | |
| 2010/0228405 A1 * | 9/2010 | Morgal | B62H 3/02 701/2 |
| 2011/0207359 A1 | 8/2011 | Matsumoto et al. | |
| 2011/0294328 A1 | 12/2011 | Katagiri et al. | |
| 2012/0238122 A1 | 9/2012 | Hirashita et al. | |
| 2013/0015951 A1 | 1/2013 | Kuramochi et al. | |
| 2013/0040486 A1 | 2/2013 | Kurumizawa et al. | |
| 2013/0047687 A1 | 2/2013 | Kurumizawa et al. | |
| 2013/0255333 A1 | 10/2013 | Kurumizawa et al. | |
| 2013/0260597 A1 | 10/2013 | Kurumizawa et al. | |
| 2013/0337669 A1 * | 12/2013 | Najera | B60L 11/1818 439/133 |
| 2014/0127924 A1 * | 5/2014 | Kim | H01R 13/62933 439/299 |
| 2014/0167695 A1 * | 6/2014 | Shimizu | H01R 13/6275 320/109 |
| 2014/0184158 A1 * | 7/2014 | Osawa | H01R 13/639 320/109 |

FOREIGN PATENT DOCUMENTS

| | | |
|---|---|---|
| CN | 102195202 A | 9/2011 |
| GB | 102007002025 * | 7/2008 |
| JP | 09-161898 | 6/1997 |
| JP | 2011-249165 | 12/2011 |
| JP | 2011-253672 | 12/2011 |
| JP | 2012-209098 | 10/2012 |

OTHER PUBLICATIONS

Chinese Office Action dated Jul. 20, 2016 in Chinese Patent Application No. 201310671276.8.

* cited by examiner

CHARGE PLUG LOCKING DEVICE

CROSS-REFERENCE TO RELATED APPLICATIONS

This application is based upon and claims the benefit of priority from prior Japanese Patent Application No. 2012-272503, filed on Dec. 13, 2012, the entire contents of which are incorporated herein by reference.

FIELD

The present invention relates to a lock device for locking a locking subject.

BACKGROUND

Vehicles that emit less carbon dioxide, such as plugin hybrid vehicles and electric vehicles, are environment-friendly and have become popular. Such a vehicle is powered by a battery, and the body of the vehicle is provided with an inlet (charge inlet) used to charge the battery. A power plug of a charge cable provided in a charging facility is connectable to the inlet. When a power switch of the power plug is turned on, power is supplied through the charge cable to charge the battery. Japanese Laid-Open Patent Publication No. 9-161898 describes one example of such a power plug.

SUMMARY

A lock mechanism (lock device) may be used to lock the charge cable to the inlet to prevent theft of the charge cable. For example, when a lock arm which is arranged pivotable at a front end of the charge cable is hooked to a catch of the inlet, the lock mechanism restricts pivoting of the lock arm to lock the charge cable to the inlet. In general, a lid is arranged at a power port including the inlet to open and close the power port. The lid is rotatably supported by a lid box. For example, the inlet and the lock mechanism may be attached to the lid box.

However, the shape of the lid box may vary according to the type of vehicle. Thus, in the case where the inlet and the lock mechanism are separate members, the attachment locations of the inlet and the lock mechanism vary according to the shape of the lid box. In this case, a dedicated set of inlet and lock mechanism has to be prepared for each shape of the lid box. This increases the number of components as well as costs.

One aspect of the present invention is a lock device. The lock device includes an inlet arranged in a vehicle and including an inlet housing into which a charge cable is insertable. A lock mechanism is capable of locking the charge cable to the inlet. The lock device includes a lock mechanism attachment portion arranged in the inlet housing and enabling attachment of the lock mechanism to the inlet housing.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

A lock device according to one embodiment will now be described with reference to FIGS. 1 to 7.

Summary of Charging System

Figure 1:
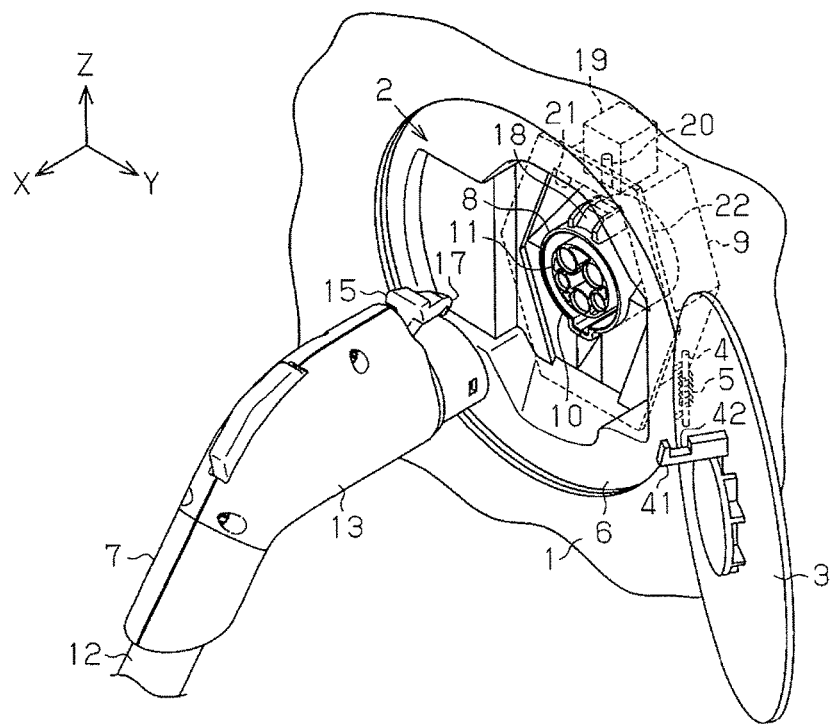
FIG. 1 is a schematic perspective view illustrating a power port including a lock mechanism and an inlet in accordance with one embodiment.

As shown in FIG. 1, a battery-driven vehicle, such as a plugin hybrid vehicle or an electric vehicle, is provided with a charging system capable of charging a battery (not illustrated) of the vehicle by means of an external power supply (household power supply, charging station, or the like). The vehicle includes a body 1 provided with a power port 2, which is arranged on a side wall of the body 1. A lid 3 that covers the power port 2 is arranged near the power port 2. The lid 3 is rotatable about the shaft 4 to open and close the power port 2. An urging member 5 is attached to the shaft 4 to urge the lid 3 to an open position. The urging member 5 is, for example, a torsion spring.

The power port 2 includes a lid box 6. An inlet 8, which serves as a power reception connector and to which a charge cable 7 extending from an external power supply is connectable, is arranged at the center of the lid box 6. The inlet 8 includes an inlet housing 9 as a casing. A cable insertion cylinder 10, which serves as an insertion portion for the charge cable 7, is accommodated in the inlet housing 9. The cable insertion cylinder 10 protrudes from the center of the inlet housing 9. A terminal unit 11 that includes signal lines, power lines, and the like is accommodated in the cable insertion cylinder 10. The charge cable 7 is one example of a locking subject. The lid box 6 is one example of an attachment subject to which the inlet 8 is attached. The cable insertion cylinder 10 is one example of a cylinder unit.

Figure 2:
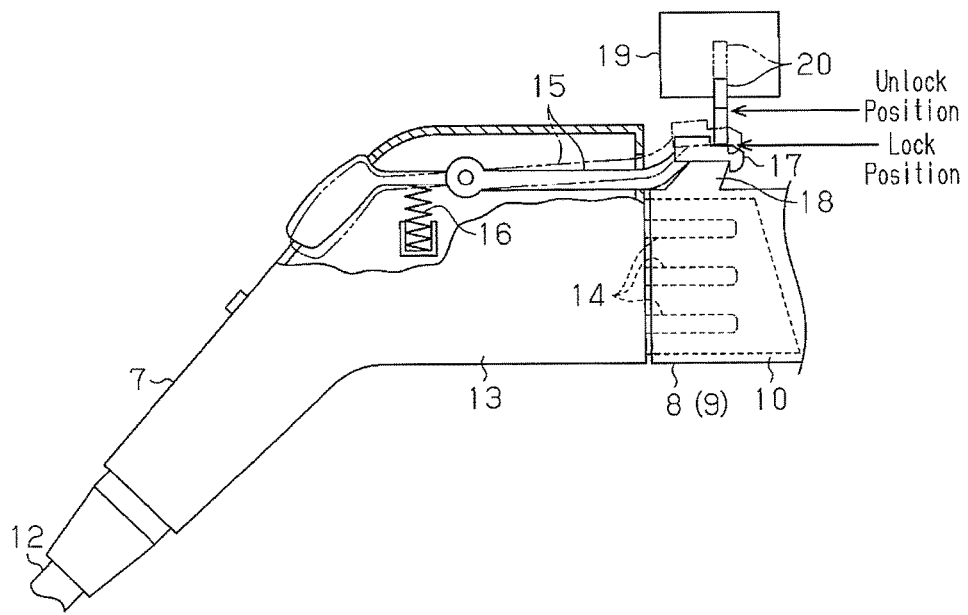
FIG. 2 is a schematic side view illustrating the state where a charge cable is connected to the inlet.

As illustrated in FIG. 2, the charge cable 7 includes a cable line 12 and a power plug 13 which serves as a power supplying connector arranged at a front end of the cable line 12. A terminal unit 14 that is connectable to the terminal unit 11 of the inlet 8 is arranged at a front end of the power plug 13. The power plug 13 includes a lock arm 15 which is pivotable in the power plug 13 and an urging member 16 which applies urging force to the lock arm 15. A hook 17 which is engageable with a catch 18 of the inlet 8 is formed at a front end of the lock arm 15. When the charge cable 7 is connected to the inlet 8, the lock arm 15 of the power plug 13 is pivoted to a closed position by the urging force of the urging member 16 so that the hook 17 is engaged with the catch 18 of the inlet 8. The hook 17 holds the charge cable 7 in the inlet 8 in a temporarily locked state and suppresses separation of the charge cable 7 from the inlet 8.

Structure of Lock Mechanism

As illustrated in FIGS. 1 and 2, a lock mechanism 19 capable of locking the charge cable 7 to the inlet 8 is arranged above the inlet 8 (inlet housing 9) in the power port 2. The lock mechanism 19 shifts the temporarily locked state of the charge cable 7 to a completely locked state. The lock mechanism 19 includes a lock pin 20 that is slidable or movable between an unlock position and a lock position. The lock pin 20 is an elongated member and arranged to reciprocate in the longitudinal direction (Z-axis direction in FIG. 1). In the state in which the hook 17 of the lock arm 15 is engaged with the catch 18 of the inlet 8, the lock mechanism 19 moves the lock pin 20 above the hook 17 (i.e., to a lock position). This causes the lock pin 20 to restrict pivoting of the lock arm 15, thereby locking the charge cable 7 to the inlet 8. The lock pin 20 is one example of a lock member.

Attachment Configuration of the Inlet

Figure 3:
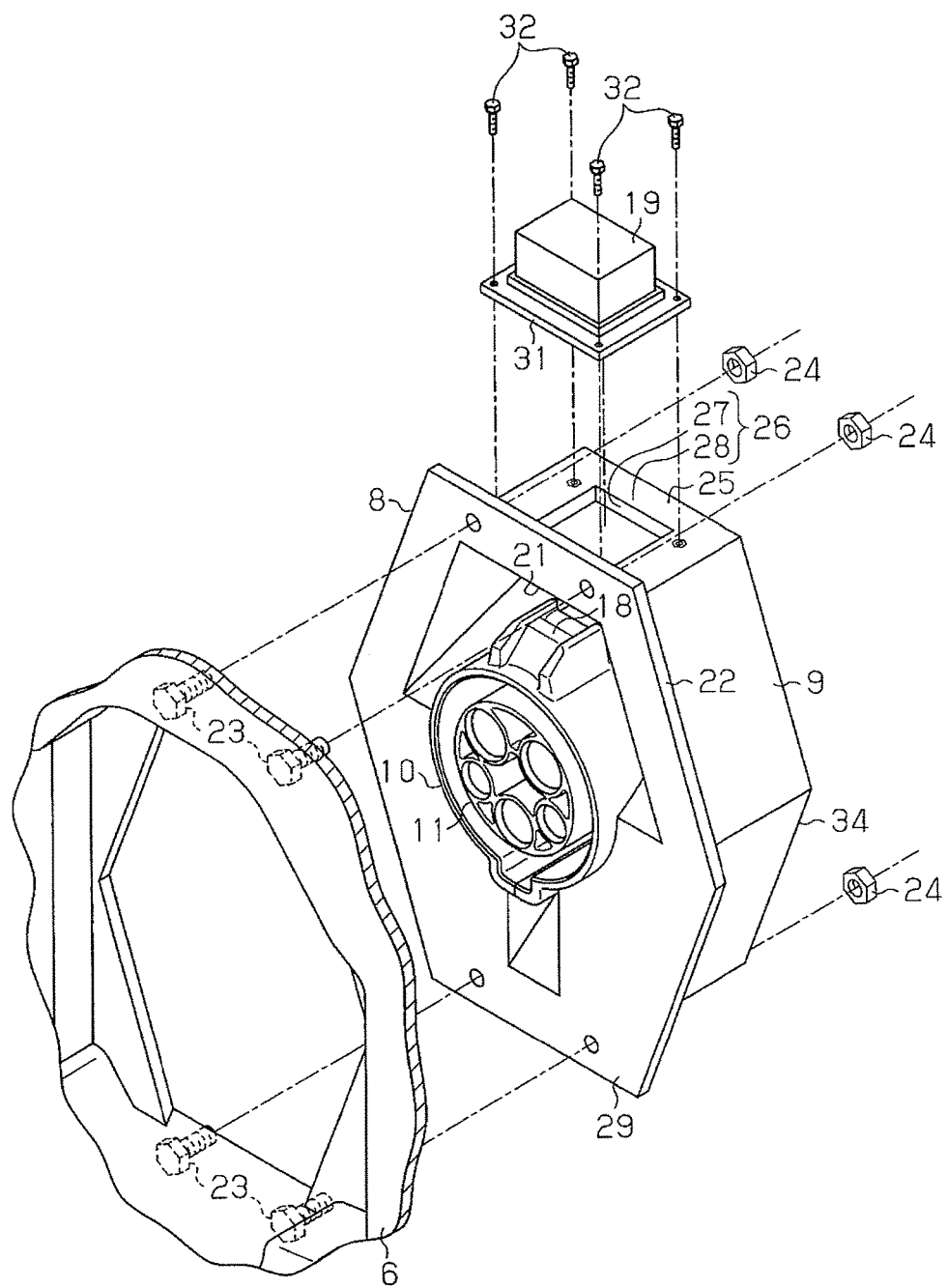
FIG. 3 is an exploded perspective view illustrating the attachment configuration of the inlet and the lock mechanism.

As illustrated in FIG. 3, the inlet housing 9 includes a cavity 21 that allows an outer surface of the cable insertion cylinder 10 to be exposed. In the present embodiment, the cavity 21 is formed from the center to an upper portion of the inlet housing 9 to expose an upper surface of the cable insertion cylinder 10 so that the hook 17 of the lock arm 15 can be inserted into the cavity 21. The inlet housing 9 includes a flange 22 which serves as an attachment portion to which the lid box 6 is attached. The flange 22 is formed on an outer circumference of a front surface of the inlet housing 9. The flange 22 is fixed to a back surface of the lid box 6 with insert bolts 23 and nuts 24 to fix the inlet 8 to the lid box 6. The insert bolts 23 are disposed on the back surface of the lid box 6. Thus, an unauthorized person cannot remove the insert bolts 23 from the front surface of the lid box 6. The cavity 21 is one example of a recess.

Attachment Configuration of the Lock Mechanism

As illustrated in FIG. 3, the inlet housing 9 includes a lock mechanism attachment portion 26 to which the lock mechanism 19 is attachable. The lock mechanism attachment portion 26 is defined as a place where the lock mechanism 19 is attached. The lock mechanism attachment portion 26 is formed on a wall of the inlet housing 9, which surrounds the cavity 21, for example, an upper wall 25 located above the cavity 21. The lock mechanism attachment portion 26 includes, although not limited to, a through hole 27 extending through the upper wall 25 of the inlet housing 9 and an attachment seat 28 arranged on the periphery of the through hole 27. The upper wall 25 of the inlet housing 9 is opposed to the outer surface (upper surface) of the cable insertion cylinder 10 via the cavity 21. The through hole 27 enables the lock pin 20 of the lock mechanism 19 to move between the lock position and the unlock position through the through hole 27.

Figure 4:
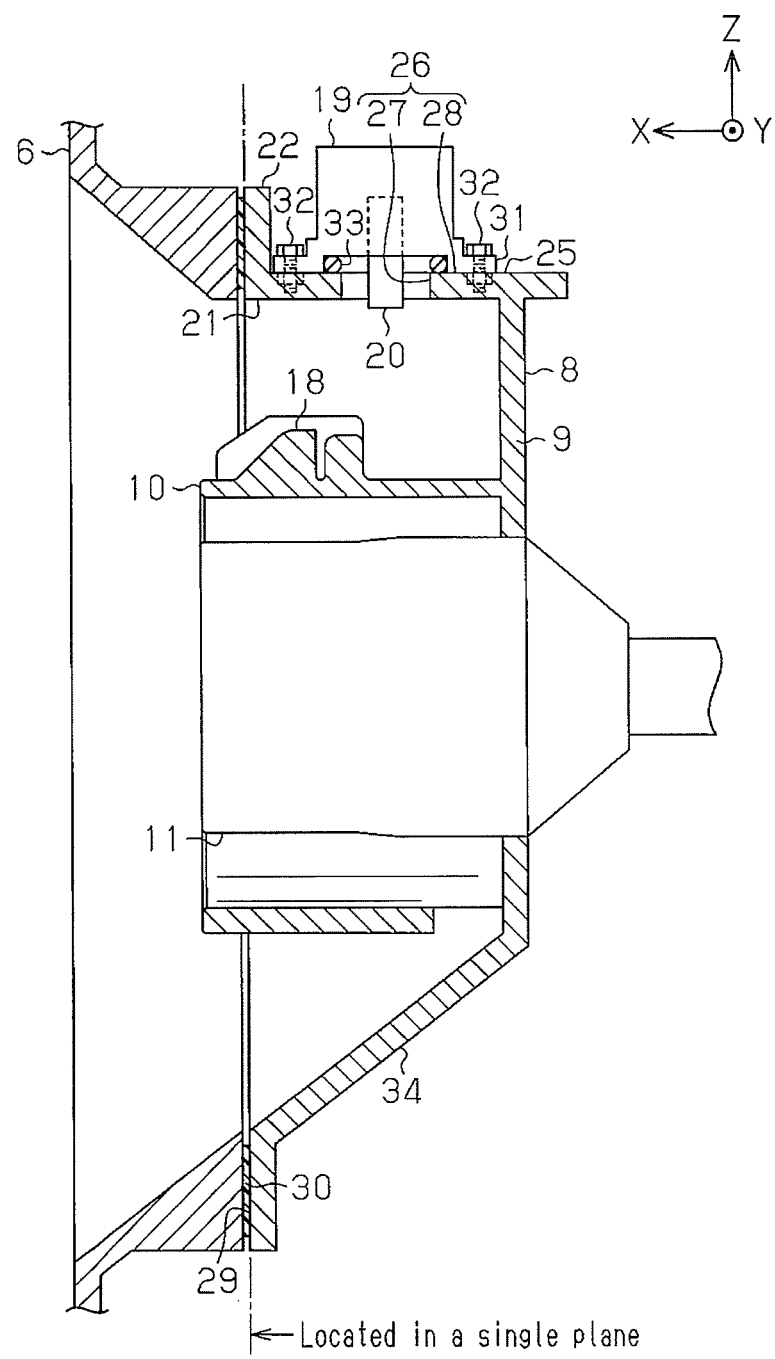
FIG. 4 is a vertical sectional view illustrating the inlet of FIG. 3.

As illustrated in FIG. 4, the inlet housing 9 includes an attachment surface 29 opposed to the lid box 6. The attachment surface 29 is located in a single plane (Y-Z plane in FIG. 4). In other words, the attachment surface 29 is flush. For example, the attachment surface 29 is flush with the surface of the flange 22. That is, the attachment surface 29 and the surface of the flange 22 are located in coplanar. A seal member 30 is arranged between the lid box 6 and the attachment surface 29 of the flange 22. The seal member 30 is, for example, an O-ring.

The lock mechanism 19 includes a casing, and a flange 31 is formed at a lower end of the casing. As illustrated in FIG. 3, the flange 31 is fixed to the attachment seat 28 of the inlet housing 9 with a plurality of (for example, four) fastening members 32. The fastening members 32 are, for example, a set of bolts and nuts (insert nuts). The attachment seat 28 includes an upper surface that receives the insert nuts. When the flange 31 is fixed to the attachment seat 28, the flange 31 covers the upper surface of the attachment seat 28. Thus, when the flange 31 is fixed to the attachment seat 28, the insert nuts are not exposed to the outside. Accordingly, an authorized person cannot remove the insert nuts from the cavity 21. As illustrated in FIG. 4, the seal member 33 may be arranged between the lock mechanism 19 and the attachment seat 28 to prevent water from entering into the cavity 21 through the through hole 27 (i.e., lock mechanism attachment portion 26). In this case, preferably, the flange 31 is formed in a stepped manner such that the lock mechanism 19 is directly attached to the inlet housing 9. In other words, the flange 31 includes a seal reception portion that receives the seal member 33. The seal member 33 is, for example, an O-ring.

Next, the operation of the inlet 8 including the lock mechanism attachment portion 26 will now be described with reference to FIGS. 4 to 7.

Figure 5A:
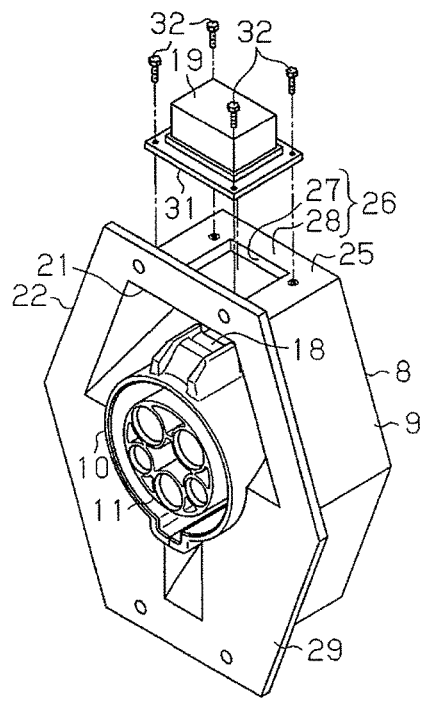
FIGS. 5A and 5B are perspective views illustrating attachment of the lock mechanism to the inlet.
Figure 5B:
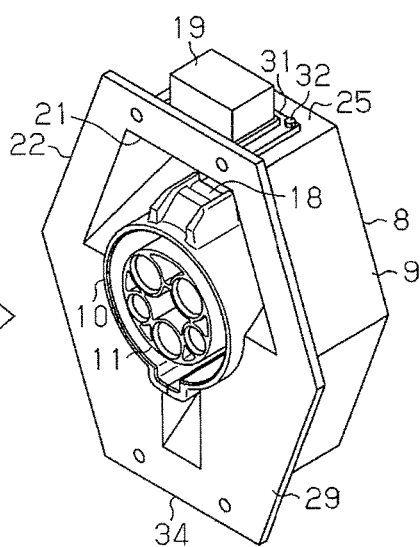
Figure 6A:
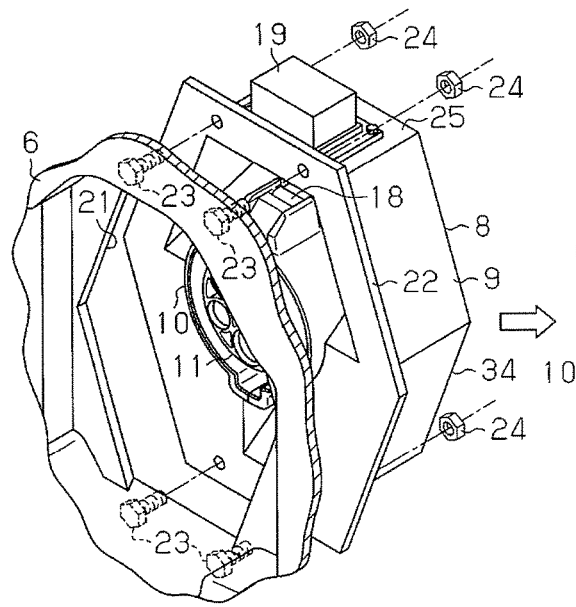
FIGS. 6A and 6B are perspective views illustrating attachment of an inlet unit to a lid box.
Figure 6B:
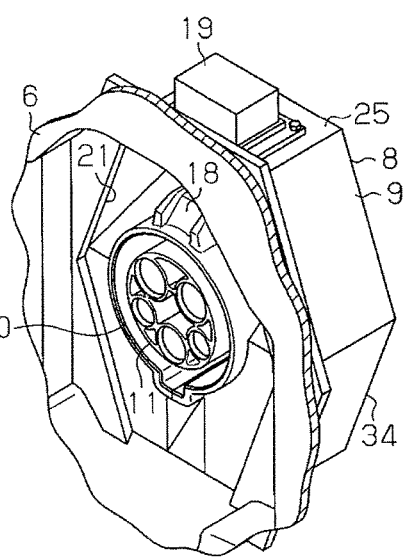

As illustrated in FIGS. 5A and 5B, the lock mechanism 19 is fixed to the lock mechanism attachment portion 26 with the fastening members 32 to assemble the lock mechanism 19 to the inlet 8. Next, as illustrated in FIGS. 6A and 6B, an inlet unit 34 in which the lock mechanism 19 is integrally assembled to the inlet 8 is fixed to the back surface of the lid box 6 with the insert bolts 23 and the nuts 24. As a result, the inlet unit 34 (the inlet 8 and the lock mechanism 19) is assembled to the lid box 6.

Figure 7A:
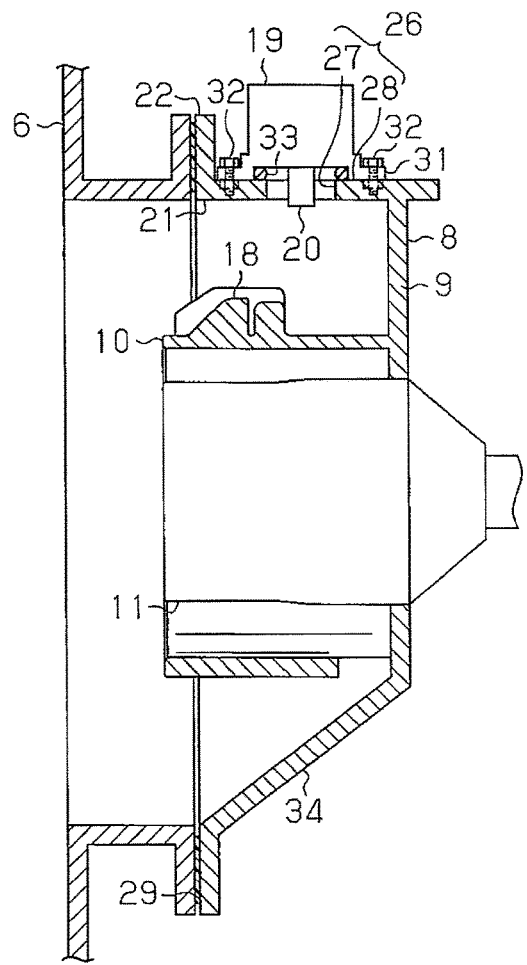
FIGS. 7A and 7B are sectional views illustrating attachment of the inlet unit to lid boxes having different shapes.
Figure 7B:
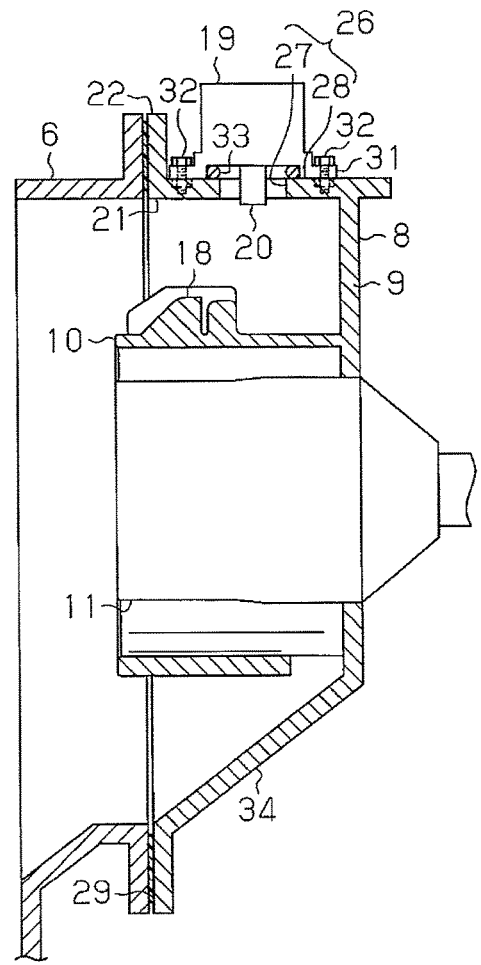

As illustrated in FIGS. 7A and 7B, the attachment subject (in the present embodiment, the lid box 6) to which the inlet unit 34 is attached may vary in shape. For example, the shape of a lid box 6 illustrated in FIG. 7A is different from that of a lid box 6 illustrated in FIG. 7B. However, since the inlet 8 and the lock mechanism 19 are integrally assembled to each other in the inlet unit 34, the positional relationship between the lock mechanism 19 (e.g., the lock pin 20) and the inlet 8 (e.g., the catch 18) is fixed. Thus, the inlet unit 34 may be attached to the lid box 6 without being affected by the shape of the lid box 6. That is, the inlet unit 34 may be applied to the different types of lid boxes 6 having different shapes. Accordingly, components of the inlet unit 34 may be standardized among the different lid boxes 6.

Further, as illustrated in FIG. 4, the attachment surface 29 of the inlet housing 9 attached to the lid box 6 is flush and located on a single plane. Thus, the lid box 6 and the inlet housing 9 are sealed with a single seal surface. Accordingly, the seal surface may be made flat, achieving a high sealing property.

In contrast with the configuration described above, for example, in the case where the inlet 8 and the lock mechanism 19 are separate members, it is necessary to separately assemble the inlet 8 and the lock mechanism 19 to the lid box 6. In this case, in order to position the lock pin 20 at a proper lock position with respect to the lock arm 15 engaged with the catch 18, it is required to assemble the inlet 8 to the lid box 6 with high accuracy as well as to assemble the lock mechanism 19 to the lid box 6 with high accuracy. Accordingly, at assembling, it is burdensome to position the inlet 8 and the lock mechanism 19 with respect to the lid box 6. On the contrary, in the present embodiment, since the lock mechanism 19 is integrally assembled to the inlet housing 9 in advance, the lock mechanism 19 is positioned with respect to the inlet 8 with high accuracy. Thus, when assembling the inlet unit 34 to the lid box 6, positioning of the lock mechanism 19 with respect to the inlet 8 is unnecessary. Accordingly, the assembling is simple.

The present embodiment has the advantages described below.

(1) The inlet housing 9 includes the lock mechanism attachment portion 26 to allow the lock mechanism 19 to be integrally assembled to the inlet housing 9. When the lock mechanism 19 is assembled to the inlet housing 9, the lock pin 20 of the lock mechanism 19 is positioned with respect to the catch 18 of the inlet housing 9. Thus, at assembling of the inlet unit 34 to the lid box 6 (attachment subject), there is no need to position the lock mechanism 19 with respect to the inlet housing 9. According to this configuration, the same inlet unit 34 may be attached to the lid boxes 6 having different shapes. As a result, components of the inlet unit 34 may be shared or standardized among the different lid boxes 6, saving costs for the components.

(2) When the lock mechanism 19 is integrally assembled to the inlet 8, the lock mechanism 19 is positioned with respect to the inlet 8. Thus, at attachment of the inlet unit 34 to the lid box 6, only the sealing between the lid box 6 and the inlet housing 9 may be considered. This allows for obtaining a high sealing property between the lid box 6 and the inlet unit 34 (the inlet 8 and the lock mechanism 19) while achieving high-accuracy positioning between the catch 18 and the lock pin 20. As a result, the assembling is simple.

(3) The lock mechanism attachment portion 26 is formed on the upper wall 25 of the inlet housing 9, which surrounds the cavity 21. Thus, the upper wall 25 having a sufficient large area (size) is defined as a place where the lock mechanism 19 is attached. Accordingly, a sufficient space for the lock mechanism attachment portion 26 may be ensured.

(4) The attachment surface 29 of the inlet housing 9 is flush and is located in a single plane. Thus, the contact surface between the attachment surface 29 and the seal member 30, that is, a seal surface may be made flat. Accordingly, a high sealing property may be obtained.

(5) Since the lock mechanism 19 is integrally assembled to the inlet 8, the number of components assembled to the lid box 6 may be reduced. This may suppress variation in the assembling of the lock mechanism 19.

(6) Since the insert bolts 23 and the nuts 24 are hidden behind the lid box 6, unauthorized removal of the inlet 8 is suppressed. Further, since the insert nuts of the fastening members 32 are not exposed from the cavity 21, unauthorized removal of the lock mechanism 19 is also suppressed.

It should be apparent to those skilled in the art that the present invention may be embodied in many other specific forms without departing from the spirit or scope of the invention. Particularly, it should be understood that the present invention may be embodied in the following forms.

Figure 8:
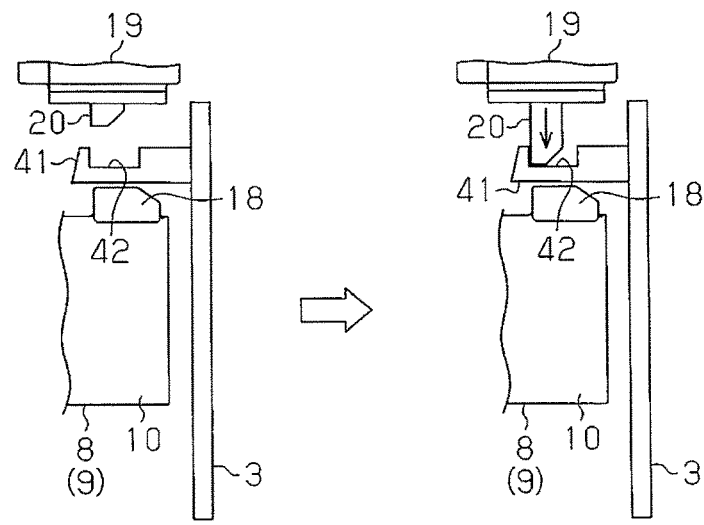
FIG. 8 illustrates an example of application of a lid lock device.

As illustrated in FIG. 8, the lock device is not limited to the charge cable lock device described in the above embodiment. For example, the lock device (lock mechanism 19) may be used as a lid lock device for locking/unlocking the lid 3. In this case, the lid 3 corresponds to a locking subject. For example, as illustrated in FIG. 1, a striker 41 including a groove 42 is arranged on the rear surface of the lid 3. As illustrated in FIG. 8, the lid lock device allows the lock pin 20 to be engaged with the groove 42 of the striker 41 in the closed state (temporarily locked state) of the lid 3, thereby locking the lid 3.

The lock mechanism 19 may be assembled to the inlet housing 9 before assembling of the inlet 8 to the lid box 6, or may be assembled to the inlet housing 9 at assembling of the inlet 8 to the lid box 6.

The lock mechanism attachment portion 26 is not necessarily arranged on the upper wall 25, and may be arranged on another wall such as a side wall of the inlet housing 9.

The attaching of the lock mechanism 19 to the inlet housing 9 is not limited to using the bolts and nuts, and any other method may be used as long as it strongly attaches the lock mechanism 19 to the inlet housing 9.

The attachment surface 29 of the inlet housing 9 is not limited to a flat surface, and may be, for example, a stepped surface.

The cable insertion cylinder 10 is not limited to be cylindrical and may have other shape.

The shape of the inlet housing 9 is not limited to substantially hexagonal shape, and may be other shapes such as substantially cylindrical shape.

The attachment structure of the inlet housing 9 is not limited to the fastening structure using the insert bolts 23, and may be appropriately changed to other structures as long as strong attachment is ensured.

The attachment location of the lock mechanism 19 may be changed to a side of the inlet 8.

One of switching a locking subject (in the embodiment, the charge cable 7) between the locked state and the unlocked state may be performed by using a manual operational member, and the other may be controlled with the lock device (lock mechanism 19). Alternatively, both of switching between the locked state and the unlocked state may be performed by using the manual operational member.

The lock mechanism 19 may directly engage the lock pin 20 with a housing of the power plug 13, thereby locking the charge cable 7.

The lock mechanism 19 may have other structures as long as it may lock the charge cable 7 to the inlet 8.

One of the charge cable 7 and the lid 3 may be selectively switched to the locked state by using a single lock device (that is, a single lock mechanism 19 including the lock pin 20).

A locking subject is not limited to the lid 3 or the charge cable 7, and may be any other component related with the power port 2.

The present examples and embodiments are to be considered as illustrative and not restrictive, and the invention is not to be limited to the details given herein, but may be modified within the scope and equivalence of the appended claims.

The invention claimed is:

1. A lock device, comprising:
an inlet attachable to an attachment subject arranged in a power port of a vehicle, the inlet including an inlet housing that accommodates a cylinder into which a charge cable is insertable, the inlet housing including
a wall surrounding a recess that exposes an outer surface of the cylinder, and
an attachment surface formed at a front edge of the wall, wherein the attachment surface is attachable to a back surface of the attachment subject at a position located toward an inner side of the vehicle from the attachment subject;

a lock mechanism capable of locking the charge cable to the inlet; and a lock mechanism attachment portion defined by the wall of the inlet housing, wherein the lock mechanism attachment portion enables attachment of the lock mechanism to the wall of the inlet housing at a position located toward the inner side of the vehicle from the attachment surface of the inlet housing.

2. The lock device according to claim 1, wherein the attachment surface of the inlet housing is flush and located in a single plane.

3. The lock device according to claim 1, further comprising:

a seal member arranged between the lock mechanism and the lock mechanism attachment portion of the inlet housing.

4. The lock device according to claim 1, wherein the lock mechanism includes a lock member movable between a lock position and an unlock position and configured to move the lock member to the lock position to lock the charge cable to the inlet and move the lock member to the unlock position to unlock the charge cable, and the lock mechanism attachment portion includes a through hole extending through the inlet housing to expose the lock member in the inlet housing, and an attachment seat arranged on a periphery of the through hole to fix the lock mechanism.

5. The lock device according to claim 3, wherein the lock mechanism includes a seal reception portion to receive the seal member.

6. The lock device according to claim 4, wherein the lock mechanism includes a flange which is opposed to the attachment seat and through which a bolt is insertable, the attachment seat includes an upper surface that receives an insert nut, and the flange is configured such that, when the flange is attached to the attachment seat with the bolt and the insert nut, the flange covers the attaching seat to prevent exposure of the insert nut to the outside.

7. The lock device according to claim 1, wherein the lock mechanism is configured to be capable of locking a lid that is arranged at a power port of the vehicle to open and close the power port.

* * * * *